Nov. 4, 1930.  T. F. BARTON  1,780,668
SYSTEM OF ELECTRIC DISTRIBUTION
Filed June 22, 1929
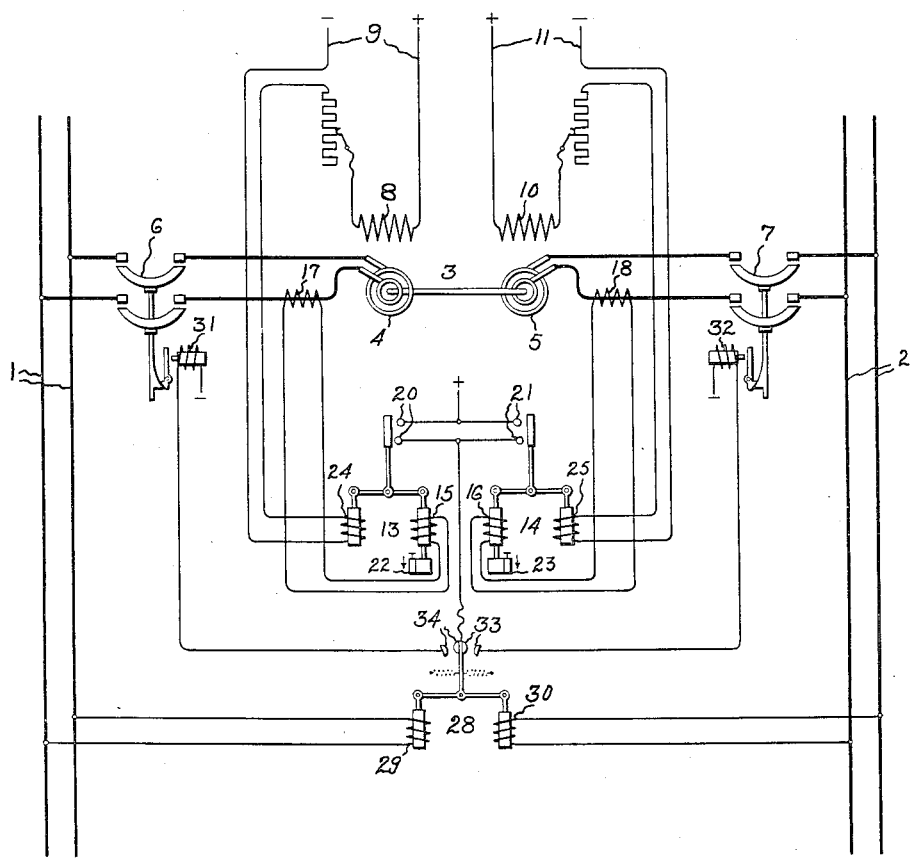
Inventor:
Theophilus F. Barton
by Charles E. Tullar
   His Attorney Patented Nov. 4, 1930

1,780,668

UNITED STATES PATENT OFFICE

THEOPHILUS F. BARTON, OF UPPER MONTCLAIR, NEW JERSEY, ASSIGNOR TO GENERAL ELECTRIC COMPANY, A CORPORATION OF NEW YORK

SYSTEM OF ELECTRIC DISTRIBUTION

Application filed June 22, 1929. Serial No. 372,891.

My invention relates to systems of electric distribution and particularly to a system in which two independently energized alternating current circuits are connected together by means of a rotary transformer comprising two mechanically connected synchronous machines.

A rotary transformer such as a frequency changer set comprising two mechanically connected synchronous machines connected to two electric circuits has a certain maximum capacity depending upon the supply voltage and the field excitation. If this maximum capacity is exceeded, one or the other of the synchronous machines pulls out of step and remains out of step until conditions change in such a manner that the machine can resynchronize. During the time that the set is out of step with one of the circuits to which it is connected, large low power factor currents flow which tend to produce large voltage disturbances on the circuit supplying current to the set. Therefore, it is desirable to disconnect the set promptly from between the two circuits after the set has fallen out of step with either of the circuits.

One object of my invention is to provide an arrangement whereby the rotary transformer is disconnected only from the circuit on which the abnormal condition, which causes the transformer to fall out of step, does not occur. Therefore, as soon as the tie between the two circuits is interrupted, the load on the transformer is reduced so that it quickly resynchronizes with the circuit to which it remains connected. The transformer then operates as a synchronous condenser to help restore normal voltage to the circuit having the abnormal condition connected thereto.

My invention will be better understood from the following description when taken in connection with the accompanying drawing, the single figure of which diagrammatically illustrates a system of electric distribution embodying my invention, and the scope of my invention will be pointed out in the appended claims.

Referring to the drawing, 1 and 2 represent two independently energized alternating current circuits which are interconnected by means of a rotary transformer 3 comprising two mechanically connected synchronous machines 4 and 5, the armature windings of which are respectively connected to the circuits 1 and 2 by the circuit breakers 6 and 7. The circuits 1 and 2 may have different frequencies in which case the rotary transformer 3 is a synchronous frequency changer. The synchronous machine 4 is provided with a field winding 8 which is excited from a suitable source of direct current 9. The synchronous machine 5 is provided with a field winding 10 which is excited from a suitable source of direct current 11. While I have shown separate sources of excitation, it is obvious that both field windings can be excited from the same source, if it is so desired.

When a fault or some other disturbance occurs on one of the alternating current circuits so that the rotary transformer 3 is pulled out of step with one of the circuits, it is desirable to disconnect the connection between the two electric circuits through the rotary transformer so that the system, on which the disturbance does not occur, is not affected by the disturbance. In accordance with my invention, I accomplish this result by providing the rotary transformer 3 with suitable means which is arranged to operate, whenever the rotary transformer is pulled out of step, to disconnect automatically the rotary transformer from the circuit which is in normal operating condition so that after the transformer is disconnected from this circuit, the transformer operates as a synchronous condenser to help restore normal voltage conditions on the faulty circuit.

In the particular embodiment of my invention shown in the drawing, I accomplish this result by providing the machines 4 and 5 with the relays 13 and 14 respectively which are arranged in any suitable manner so that they operate in response to out of step conditions of the respective machines. As shown, the relays 13 and 14 are respectively provided with current windings 15 and 16 which are respectively connected in series relation with the armature windings of the machines 4 and 5 by the current transformers 17 and 18 so that they operate in response to the currents in the respective machines. The relays 13 and 14 are arranged so that they close their respective contacts 20 and 21 when the armature current of the associated machine reaches its pull out value. In order that momentary surges in the current may not operate the relays 13 and 14, they are provided with suitable time delay devices such as the dash pots 22 and 23 respectively. Since the pull out current of a synchronous machine varies with the field excitation of the machine, I also provide the relays 13 and 14 with the compensating windings 24 and 25 which are respectively energized in accordance with the exciting current of the associated machine. As shown in the drawing, the relays 13 and 14 are of the balance type, the windings 24 and 25 being differentially arranged respective to the windings 15 and 16. The windings 24 and 25 are also shown as being connected directly in series with the field windings 8 and 10 respectively. Therefore, it will be observed that the greater the excitation, the greater the armature current of the associated machine has to be in order to cause the associated relay to close its respective contacts.

In order to control the opening of the circuit breaker between the rotary transformer 3 and the circuit which is in normal operating condition when a fault occurs on the other circuit, I also provide a voltage balance relay 28 having two opposing coils 29 and 30 which are respectively energized in response to the voltages of the circuits 1 and 2. The relays 13, 14 and 28 jointly control the trip coils 31 and 32 of the circuit breakers 6 and 7 respectively so that when either of the synchronous machines of the rotary transformer is pulled out of step the circuit breaker between the rotary transformer 3 and the circuit having the higher voltage is opened.

The operation of the arrangement shown in the drawing is as follows: When both of the circuit breakers 6 and 7 are closed so that the rotary transformer 3 is connected between the circuits 1 and 2 and a disturbance occurs on one of the circuits so that the rotary transformer is pulled out of step, one or both of the relays 13 and 14 closes its contacts. For example, if the disturbance occurs on the circuit 1, the probabilities are that the relay 13 will close its contacts 20 before the relay 14 closes its contacts 21 because the disturbance will lower the voltage of the circuit 1 to such a low value that the percentage change in the current output of the synchronous machine 4 will be much greater than the percentage change of the current input into the machine 5, the voltage of which does not decrease as much as the voltage of the circuit 1. Since the disturbance on the circuit 1 lowers the voltage of the circuit 1 with respect to the circuit 2, the voltage balance relay 28 closes its contacts 33 in the circuit of the trip coil 32 of the circuit breaker 7 so that the rotary transformer is disconnected from the normal circuit 2. In response to the opening of the circuit breaker 7, the machine 4 of the rotary transformer 3 resynchronizes with the circuit 1 and then operates a synchronous condenser and helps to restore normal voltage conditions on the circuit 1.

If the fault or disturbance occurs on the circuit 2, relay 14 operates to close its contacts 21 and the voltage balance relay 28 operates to close its contact 34 so that the trip coil 31 of the circuit breaker 6 is energized to effect the disconnection of the rotary transformer 3 from the normal circuit 1. In this case the synchronous machine 5 then resynchronizes and helps to restore normal voltage conditions on the circuit 1.

Therefore, it will be observed that when a fault occurs on either of the circuits which causes the rotary transformer 3 to be pulled out of step, the rotary transformer is disconnected only from the circuit on which the fault or disturbance does not occur.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, two alternating current systems, a rotary transformer interconnecting said systems, and means operative upon the occurrence of a disturbance on one of said systems which causes said transformer to fall out of step for effecting the disconnection of said transformer only from the system on which the disturbance does not occur whereby said transformer operates as a synchronous condenser across the system on which the disturbance occurs.

2. In combination, two alternating current systems of different frequencies, a synchronous frequency changer interconnecting said system, and means operative upon the occurrence of a disturbance on either of said systems which causes said frequency changer to fall out of step for effecting the disconnection of said frequency changer from the system having the higher relative voltage while the machine is operating out of step.

3. In combination, two alternating current systems, a rotary transformer comprising two mechanically connected synchronous machines respectively connected to said systems, and means operative upon the occurrence of one of said machines falling out of step for effecting the disconnection of the other machine from its respective system so that the machine which has fallen out of step may automatically resynchronize with its respective system and operate as a synchronous condenser.

4. In combination, two alternating current circuits, a rotary transformer comprising two mechanically connected synchronous machines respectively connected to said circuits, and means responsive to a predetermined relation between the currents through one of said machines and the field winding thereof for controlling the connection of said transformer to said circuits.

5. In combination, two alternating current circuits, a rotary transformer comprising two mechanically connected synchronous machines respectively connected to said circuits, and a differential relay having windings respectively energized in accordance with the current flowing between one of said machines and its respective circuit and the current in the field circuit of said one of said machines for controlling the connection of the other of said machines to its respective circuit.

6. In combination, two alternating current circuits, a rotary transformer comprising two mechanically connected synchronous machines respectively connected to said circuits, and means for effecting the disconnection of one of said machines from its respective circuits including means responsive to the currents flowing between the other of said machines and its respective circuit, and means responsive to the relative voltages of said circuits for effecting the disconnection of machine connected to circuit having the higher relative voltage.

7. In combination, two alternating current circuits, a rotary transformer comprising two mechanically connected synchronous machines respectively connected to said circuits and means for controlling the connections between said machines and their respective circuits including a relay associated with each machine and having windings respectively energized in accordance with the armature and field currents of the associated machine and a relay responsive to the relative voltages of said circuits.

8. In combination, two alternating current circuits, a rotary transformer comprising two mechanically connected synchronous machines respectively connected to said circuits, and means for controlling the connections between said machines and their respective circuits including means responsive to an out of step condition of said machines and a relay responsive to the relative voltages of said circuits.

In witness whereof, I have hereto set my hand this 20th day of June, 1929.

THEOPHILUS F. BARTON.